United States Patent [19]

Hauge

[11] 4,088,738

[45] * May 9, 1978

[54] PROCESS FOR PRODUCING PHOSPHORIC ACID USING MIXED ACID FEED AND A DICALCIUM PHOSPHATE INTERMEDIATE

[75] Inventor: Douglas Oliver Hauge, Lafayette, Calif.

[73] Assignee: United States Gypsum Company, Chicago, Ill.

[*] Notice: The portion of the term of this patent subsequent to Nov. 11, 1992, has been disclaimed.

[21] Appl. No.: 675,020

[22] Filed: Apr. 8, 1976

[51] Int. Cl.² ............................................. C01B 25/16
[52] U.S. Cl. ................................. 423/319; 423/167; 423/307; 423/308; 423/320; 423/555
[58] Field of Search ............... 423/167, 319, 320, 555, 423/307, 308

[56] References Cited

U.S. PATENT DOCUMENTS

| | | | |
|---|---|---|---|
| 1,866,657 | 7/1932 | Levermore | 423/167 |
| 1,910,808 | 5/1933 | Moore | 423/320 |
| 2,013,970 | 9/1935 | Moore | 423/320 |
| 2,114,600 | 4/1938 | Larsson | 423/319 |
| 3,003,852 | 10/1961 | Nordongren | 423/167 |
| 3,619,136 | 10/1971 | Case | 423/320 |
| 3,715,191 | 2/1973 | Rushton et al. | 423/320 |
| 3,803,293 | 4/1974 | Randolph et al. | 423/167 |
| 3,919,395 | 11/1975 | Hauge | 423/167 |
| 3,988,420 | 10/1976 | Loewy et al. | 423/167 |
| 4,012,491 | 3/1977 | Hauge | 423/167 |

FOREIGN PATENT DOCUMENTS

| | | | |
|---|---|---|---|
| 484,037 | 4/1938 | United Kingdom | 423/319 |
| 799,490 | 8/1958 | United Kingdom | 423/320 |
| 1,234,405 | 6/1971 | United Kingdom | 423/320 |

Primary Examiner—O. R. Vertiz
Assistant Examiner—Eugene T. Wheelock
Attorney, Agent, or Firm—Kenneth E. Roberts; Robert H. Robinson; Samuel Kurlandsky

[57] ABSTRACT

A method of making phosphoric acid and gypsum through a precipitated phosphate intermediary which comprises mixing a precipitated dicalcium phosphate with a highly dispersed reaction admixture of sulfuric acid and phosphoric acid, at a temperature between about 25° and 80° C; and withdrawing and separating phosphoric acid containing up to about 45% or more $P_2O_5$ and gypsum containing generally less than 0.25% $P_2O_5$. The resultant gypsum is highly filterable and very low in occluded phosphate value. Preferably, the process involves first obtaining a weak phosphoric acid solution from and by leaching as-mined phosphate mineral containing material to obtain the precipitated dicalcium phosphate; and then converting the precipitated phosphate by the process to the strong phosphoric acid solution.

14 Claims, 2 Drawing Figures

PROCESS FOR PRODUCING PHOSPHORIC ACID USING MIXED ACID FEED AND A DICALCIUM PHOSPHATE INTERMEDIATE

BACKGROUND OF THE INVENTION

1. Field of the Invention

This invention relates to an improved process for the recovery of phosphoric acid from phosphatic-mineral-containing material; and more particularly relates to, in contrast to conventional sulfuric acid wet-processes, obtaining a more concentrated and/or higher purity phosphoric acid from an intermediate precipitated dicalcium phosphate as well as avoiding losses of $P_2O_5$. In this specification phosphate values, except where indicated to the contrary, will be expressed on a weight percent basis and as phosphoric acid anhydrite ($P_2O_5$) rather than as for example expressing phosphate content of phosphoric acid as percentage $H_3PO_4$. Thus, for illustration, a reference to phosphoric acid solution as having a 30-34% $P_2O_5$ phosphate content corresponds to a concentration of 40-47% expressed as $H_3PO_4$.

The present invention also relates to a wet chemical process for directly forming phosphoric acid of higher purity and/or greater concentration involving a different sequence of steps without the necessity of evaporation.

The process of the present invention is an improvement over the usual wet processes for the production of phosphoric acid from natural phosphate rock with the aid of concentrated sulfuric acid, wherein the phosphate rock, ground to a suitable fineness, is digested slowly, fed by a fairly concentrated sulfuric acid (60-96% by weight), with the formation of calcium sulfate in finely divided condition. In those processes the time of digestion with the sulfuric acid is about 4 hours; and the usual maximum concentration of the resultant phosphoric acid without evaporative concentration is from 40% to 50% $H_3PO_4$ (or about 28% to 37% $P_2O_5$). This high a concentration requires a very high quality and high purity phosphate mineral, i.e. about 80 B.P.L., to minimize impurities build up and consequent viscidity and sludges in the obtained phosphoric acid. The calcium sulfate which is formed in such a process entrains large quantities of phosphoric acid, the recovery of which entails voluminous washings with water with consequent dilution of these portions of the phosphoric acid product to an extent such that subsequent concentration by evaporation is necessary to produce phosphoric acids suitable for most purposes and which may be transported economically. Because of its corrosive nature and the build up of sludges, concentration of phosphoric acid by evaporation is a difficult and expensive operation. Efforts to increase the concentration of the acid resulting from the initial digestion of phosphate rock with sulfuric acid in the wet process have resulted in incomplete decomposition of the phosphate rock and the production of a more finely divided calcium sulfate that is more difficult to settle and filter.

Concerning the material suitable for use in the typical wet processes, generally beneficiated rock is required and it should have a content of about 64-87 B.P.L., or about 29-40% $P_2O_5$ content. Many ores have calcium carbonate associated with the phosphate that cannot be removed by beneficiation, and its quantity is detrimental to sulfuric acid consumption. Further carbonate contributes to foaming during acidulation. Organic matter present in the rock tends to decrease filtration rates and reduce porosity of any filter cakes obtained through hindering well developed gypsum crystal growth. Thus it is common to require the additional step of calcining the rock before use to reduce the organics in the carbonate. Of even greater importance in treating the rock, residual iron and aluminum, hereinafter "I & A", may interfere with the growth of the gypsum crystals in the acid production; cause sludges to form in the resultant acid; and cause a form of insoluble and unavailable phosphates to form in further products made of the resultant acid. Even after the resultant acid has been clarified, filtered and vacuum evaporation concentrated, wet process phosphoric acid deposits scale and sludge with time. The normal clarification over a several day period of time results in the separation of a sludge that contains about 40% $P_2O_5$ which requires further processing to avoid considerable phosphate value loss; and such further processing of the sludge is difficult. In addition many ore deposits contain considerable material of much lower phosphate value than can be economically utilized.

Generally in the improved wet processes of the art, beneficiated rock is dissolved in a mixture of fresh sulfuric acid and recycled phosphoric acid, obtained in the process, followed by filtration removal of the gypsum precipitated. This results in a filter acid of about 29-32% $P_2O_5$ which may be then concentrated to higher $P_2O_5$ value by vacuum evaporation which is quite energy intensive. The vacuum evaporation must be carefully controlled due to circulating nuclei of impurities, that is, impure calcium sulfate, fluorides and silicates, and to avoid their formation as scale on the equipment. In the digesting of the rock with the strong acid, about 97% of the sulfate is converted generally to gypsum and some 2-3% appears to remain in the phosphoric acid as dissolved sulfate. That dissolved sulfate content must be closely controlled to avoid calcium sulfate scaling at a later stage.

Regarding the resultant gypsum, this is considered as a practical manner as an unuseable by-product which must be disposed of. Phosphoric acid tends to become occluded in the gypsum crystal nuclei; and the shape and manner of gypsum growth tends to in many cases capture more valuable phosphate value and can end up in a virtually unfilterable mass that is difficult to handle and dispose of. In addition fluorosilicates and fluoroaluminates can complex on the growing gypsum crystal, depending upon the sulfuric acid concentration present, which also deleteriously affects gypsum crystal shape and size. Further if small unfiltered gypsum crystals remain in the recycled phosphoric acid they tend to, at normal operating temperatures, re-dissolve and then re-precipitate on the phosphate values of the rock before the acid can digest the phosphate, thus also contributing to further phosphate losses in the system. Thus phosphate losses attributable to the gypsum include encapsulated unreacted phosphate containing material, entrapped liquid and a third type, where some $HPO_4^{-2}$ ions replace some of the $SO_4^{-2}$ ions in the growing crystal structure, sometimes referred to as syncrystallized phosphate gypsum. All of these phosphate losses will hereinafter be referred to as "occluded phosphate".

2. Description of the Prior Art

Virtually all of the efforts in the art of chemically leaching phosphate values from phosphate-mineral-containing materials appear to have been directed to acidulating the ore or rock directly to phosphoric acid solutions without an intermediary precipitated salt; and these efforts involve the use of strong leaching solutions in concentrated forms to obtain directly a strong leach liquor which is the virtual end product of such processes. However, there has been some incidental suggestion of some sort of intermediary precipitated salt material in a few of the art teachings. For example, U.S. Pat. No. 2,013,970 to Moore shows an intermediate formation of dicalcium phosphate in a concentrated sulfuric acid leaching of ground phosphate rock. Preferably, according to this process, the intermediary is then calcined to calcium pyrophosphate and treated with pure sulfuric acid to obtain a 45°–50° Baume phosphoric acid (about 44–51% $P_2O_5$). However in a non-preferred embodiment it is suggested that the dicalcium phosphate cake, if sufficiently pure, might be treated with concentrated sulfuric acid to convert the phosphate to ortho-phosphoric acid without the preferred calcination. It is noted that in the initial leaching the phosphatic material is subjected to the action of sufficient sulfuric acid to form a mono-calcium phosphate solution but insufficient to form more than a minor proportion of free phosphoric acid in the leach liquor; and it is the precipitated product from this reaction that is being utilized by Moore for subsequent treatment. Secondly, the teachings on conversion of the dicalcium phosphate intermediary to ortho-phosphoric acid without the calcination steps would appear to, due to the concentrations of the materials being dealt with and the lack of dispersion of ionic forces in reaction, cause an encapsulation of a substantial part of the dicalcium phosphate particle being dissolved by the gypsum being precipitated thus making it difficult to completely get at, extract and dissolve the phosphate values and also result in entrapping large quantities of phosphate values with the gypsum being precipitated. Further it is noted that in this ostensible variation the phosphoric acid is leached out with previously prepared 25°–30° Baume phosphoric acid after the sulfuric acid treatment and gypsum precipitation, which offers additional obvious disadvantages. This patent ostensibly is an improvement over Moore's prior U.S. Pat. No. 1,910,808, in which he attempted to remove impurities before conversion of the leached phosphate content to phosphoric acid by converting the mono-calcium phosphate solution successively to ammonium phosphate, and then a "water insoluble calcium phosphate" and finally phosphoric acid; and his prior U.S. Pat. No. 2,233,956.

Another proposed approach has been to form as the starting reactant a complex or polyphosphate which is then digested with either sequentially concentrated phosphoric acid and then sulfuric acid or with a mixture of concentrated sulfuric acid phosphoric acids to result in ortho-phosphoric acid of high concentration (U.S. Pat. Nos. 2,338,408; 2,384,813; and 2,384,814). However such proposed processes require an energy intensive heating to form the complex or polyphosphate to avoid impurities, particularly fluorine and I & A, being carried through the process and to avoid crude, low grade and low phosphorous content resultant acid product.

Despite patent literature statements to the contrary on purity and filterability of co-produced gypsum; this material essentially remains a difficult to handle and drain, slowly filtering media which as a practical matter traps too much phosphate value and generally results in a sludge frequently causing process stoppages. Much of the older patent literature does not discuss how much phosphate value, as $P_2O_5$, is occluded or what the actual filtering rates are in their processes. However, as a practical matter, refinements to the old wet processes still leave about generally 2–3% phosphate values as $P_2O_5$ occluded in the gypsum; filtration is difficult and the calcium sulfate dihydrate is contaminated with considerable sands, fluorine silicates and the like.

SUMMARY OF THE INVENTION

It is therefore an object and advantage of the present invention to provide a process for the preparation of a phosphoric acid that has a higher concentration of phosphate value on a $P_2O_5$ basis than conventional wet process phosphoric acids and is generally without the sludge and gypsum contaminations of the resultant phosphoric acid product of the conventional wet processes.

Another object and advantage is the obtention of gypsum dihydrate crystals that are virtually free of occluded phosphate, are of a highly filterable nature, and are of the quality that they may be considered a co-product rather than a by-product which must be disposed of.

Still another object and advantage is to provide alternative steps for the removal of fluoride impurities in a method of making phosphoric acid.

Another object is to provide not only phosphoric acid products which have less I & A than conventional wet-process phosphoric acid but which also may be converted to a super phosphate solution with less removal of I & A than is conventional.

Still another object and advantage is to provide a concentrated phosphoric acid resultant product which, without evaporative condensation concentration, is of a higher concentration yet less subject to sludge and viscidity and without need for clarification than conventional wet process phosphoric acid.

Still another object and advantage is to provide a process for the preparation of concentrated phosphoric acid from phosphatic mineral containing rocks and ores which though not necessarily low in $P_2O_5$ value have been heretofore unuseable because of high impurities, such as I & A, contents.

The fulfillment of the above and other objects and advantages of the present invention are accomplished basically by the steps of forming a precipitated dicalcium phosphate; thoroughly mixing at a temperature between about 25°–80° C and more preferably about 40° and 70° C the dicalcium phosphate with a reaction mixture of sulfuric acid and phosphoric acid that has been so diluted and is in such ionic proportions and dispersion to the precipitated calcium phosphate that there is very little phosphate loss in the precipitating gypsum; and withdrawing and separating phosphoric acid containing incrementally increasing amounts of $P_2O_5$ to preferably obtain an at least about 40% $P_2O_5$ phosphoric acid and gypsum containing less than 0.25% $P_2O_5$. In a highly optimized preferred embodiment a fluid reaction medium is formed comprising, on a parts by weight basis, about 33.8% phosphoric acid (expressed as $P_2O_5$), about 7¾% sulfuric acid and about 49.2% water. The reaction medium is maintained at about 45° C; and to the reaction medium is added incremental successive portions each of about 9% precipitated dicalcium phosphate. A 40% phosphoric acid product is obtained along with an easily filterable, easily washable calcium sulfate dihydrate containing, after washing, less than 0.2% $P_2O_5$.

A basic concept to this invention is effecting a dilution and dispersion, with thorough agitation and admixing, of the reacting chemicals at the solids-liquids interface so as to convert the phosphate value from a calcium salt solid to liquid solubilized acid while preventing the simultaneous coating of solid phosphate particles with a gypsum solids boundary, which prevents further dissolution of the calcium phosphate and causes the entrapment of liquid or solid phosphate values in the precipitating gypsum crystals. This represents a marked departure from the practices of the prior art in the sense of using dilute solutions and sequential additions of low concentration phosphate values to obtain a concentrated solution. Further, the formation of gypsum dihydrate at the temperature involved here present a marked departure from prior practices.

BRIEF DESCRIPTION OF THE DRAWINGS

The invention will be more readily understood by reference to the ensuing description of the preferred embodiments and reference to the accompanying drawings in which.

DETAILED DESCRIPTION OF THE PREFERRED EMBODIMENTS

Figure 1:
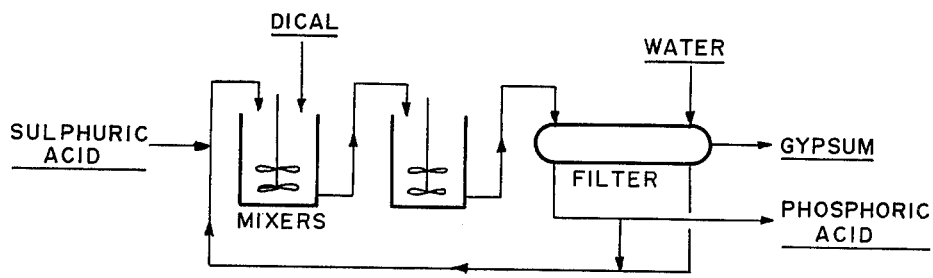
FIG. 1 represents a schematic flow diagram of the present process.

In the conventional manufacture of phosphoric acid by concentrated sulfuric acid attack, the recovery rate of $P_2O_5$ from the phosphate mineral in the liquor extracted by the acid is greatly diminished by that amount of $P_2O_5$ occluded with the dihydrated calcium sulfate and also from the yields of filtration and washing of the obtained gypsum and of tailings in attempts to recover still further $P_2O_5$. Further the obtained phosphoric acid contains considerable impurities making subsequent concentrations and conversions difficult. It is known in the mineral extraction field that the rate of decomposition of ionic minerals is usually limited by the diffusion of the reaction products from the dissolving of the solid phase during the course of the reaction, and, because of the slowness of diffusion exchange, the reaction products accumulate in the boundary layer of the solid-solution up to a level close to saturation. It has now been found that with sufficient dispersion of reacting ions in the interchange boundary of precipitated calcium phosphate and sulfuric and phosphoric acids and precipitated gypsum there is a very complete reaction of high purity without the occlusion of phosphate values characteristics of prior proposals.

Broadly stated this invention takes off from a point of instead of treating the raw material, as for example the phosphate ore or rock, with sufficient sulfuric acid to convert the apatite content directly to ortho-phosphoric acid, the raw material is first subjected to the action of a dilute acid mixture of sulfuric acid and a mineral acid whose calcium salt is water soluble at a concentration gradient correlated to diffusion rates and dissolution rates to convert the apatite phosphate to a very dilute phosphoric acid solution which is then concentrated in phosphate value and purified preferably by a step-wise neutralization to produce a precipitated calcium phosphate salt. Copending application Ser. No. 518,128, filed Oct. 25, 1974 discloses that the obtained precipitated calcium phosphate salt may be reacted with stoichiometric amounts of concentrated sulfuric acid to precipitate calcium sulfate gypsum and convert the phosphate content to ortho-phosphoric acid, the by-product gypsum precipitated being removed by filtration. It has now been found that, by carrying out these conversion steps in a highly dilute solution to obtain a thorough dispersion and separation of the reaction ions it is possible to greatly improve the efficiency of the recovery of phosphate values, both by producing directly without evaporative concentration a higher concentration of ortho-phosphoric acid and by obtaining much lessened phosphate losses occluded in the co-produced gypsum. Thus, referring to FIG. 1 of the drawing, the precipitated dicalcium phosphate feed material may be gradually metered into a reaction area fed by a diluted acid mixture of sulfuric acid and phosphoric acid at a temperature and concentration gradients correlated to ionic diffusion rates and dissolution-precipitation rates to produce very pure gypsum and phosphoric acid products. The phosphoric acid obtained is then reacted with further increments of precipitated dicalcium phosphate and preferably further dilute sulfuric acid-phosphoric acid mixture until the desired $P_2O_5$ level is reached; then the final product phosphoric acid is withdrawn from the process.

The precipitated dicalcium phosphate feed material may be from any desired source, but I have found that very beneficial results are obtained with either the dicalcium phosphate product of my U.S. Pat. No. 3,919,395 or further more advantageously from an improvement on that obtained by my copending application Ser. No. 518,128. That latter application discloses obtaining a precipitated calcium phosphate by contacting any phosphate-mineral-containing material with a leach acid containing on the order of about 6 equivalents of acid and about one mole of calcium per mole of $P_2O_5$ in the phosphatic-mineral-containing material; withdrawing from the contact medium a phosphoric acid leach liquor containing about 5–7% $P_2O_5$ and then obtaining the precipitated calcium phosphate preferably by a two step neutralization and concentration including the additional steps of raising the pH of the leach liquor to about 2–3 to precipitate impurities, which are then separated out and then raising the pH of the leach liquor to about 3–5 to precipitate calcium phosphate of high purity. The thus obtained precipitated calcium phosphate is imminently suitable in accordance with the present invention. However, for some purposes it is not necessary to obtain the high degree of purity of phosphoric acid obtained thereby; and thus according to the present invention it is imminently suitable to utilize a calcium phosphate containing more impurities by, for example, utilizing a single step neutralization, without impurities separation to convert the 5–7% phosphoric acid leach liquor to precipitated calcium phosphate, by neutralizing at a pH of 3–5. Further, partial impurity neutralizations may be accomplished as for an intermediate product to be used for the dicalcium phosphate feed according to the present invention, by heating the 5–7% $P_2O_5$ phosphoric acid leach liquor to evolve some hydrogen fluoride as a gas and then a single neutralization immediately to a pH of 3–5 to precipitate a less pure calcium phosphate.

Generally, the precipitated dicalcium phosphate feed material will be added in increments of about 6% to about 16% by weight of the total reaction mixture. Somewhat larger or smaller amounts may be satisfactorily utilized, but generally without further substantial advantages. The rate of dicalcium phosphate addition will depend generally upon the $P_2O_5$ level of the reaction mixture at the point of the particular addition, the sulfuric acid moiety present, and the temperature. Thus it is generally preferred to add increments of about 8% to about 14%, and especially around 8-10% when the $P_2O_5$ level of the total mixture is below about 40%, the reaction temperature is between about 25° C and about 80° C and the sulfuric acid additions are at about 10% of the reacting mixture. The dicalcium phosphate additions may be at the upper portion of this range or even higher at the upper portions of the temperature range or somewhat higher, especially if the dicalcium phosphate being added is in the anhydrite form. Above about 45% $P_2O_5$ in the mixture, because of lowering solubilities of the dicalcium phosphate it is preferred to add the dicalcium phosphate in increments at the lower end of the range, and preferably at about 5% or somewhat less, resulting in generally lessened step-wise increases in $P_2O_5$ content of the resultant product.

The amount of sulfuric acid introduced into the reaction area is that amount sufficient to convert the precipitated calcium phosphate present to phosphoric acid; but as stated above the ions must be thoroughly dispersed with water for intimate reaction. Of course the acid moiety is augmented by the phosphoric acid present; which also aids in the dispersability of reacting ions. The amount of sulfuric acid should be sufficient to precipitate all calcium present as calcium sulfate; and the amount of phosphoric acid may supplant this somewhat as it is present to provide the twofold function of increasing acid moiety and as a convenient means for achieving thorough dispersion dilution, as will be set forth hereinafter in more detail. Thus the sulfuric acid moiety will be about 4–12% and generally about 6% by weight of the acid mixture for an about 9% addition rate of precipitated phosphate.

The phosphoric acid moiety, like the sulfuric acid moiety will depend on the particular amount of precipitated calcium phosphate entering the reaction areas. Generally about 20 to about 35% by weight on a $P_2O_5$ basis of the acid mixture will be phosphoric acid for an about 9% precipitated calcium phosphate addition rate.

The water of dilution may be added in many ways, for example in a batch process this may be incoming water, recycled wash waters from prior batches and the like as shown in FIG. 1. In hereinafter described particularly preferred continuous operations, very little additional water will be necessitated by the use of a portion of the derived phosphoric acid product as a recycle for water of dilution and provision of the phosphoric acid moiety. Generally the dilution water will constitute about 40 to about 60% by weight of the dilute acid mixture of sulfuric-phosphoric acids entering the reaction area for an about 9% precipitated calcium phosphate addition rate.

The sulfuric acid, phosphoric acid, gypsum seed crystals and calcium phosphate precipitate are mixed by means of any suitable agitation device, in order to achieve an intimate blending and uniform reaction.

According to the invention, the operational conditions are so selected as to cause the reaction mixture of precipitated calcium phosphate, phosphoric acid, sulfuric acid and water to become thoroughly dispersed and then undergo complete reaction. In a further variation on this point, as the neutralizing media one may use calcium carbonate to precipitate iron and aluminum and then use calcium hydroxide to precipitate fluoride in the two step neutralization to obtain a very high purity dicalcium phosphate precipitate intermediate feed for the process of the present invention. As a further variant, one can instead of removing the fluoride in the dical precipitation stage, allow the fluoride to come along with the dicalcium phosphate precipitate and then add a portion of the sulfuric acid either alone or along with the commencement of heating to remove the fluoride at this stage as hydrogen fluoride.

Figure 2:
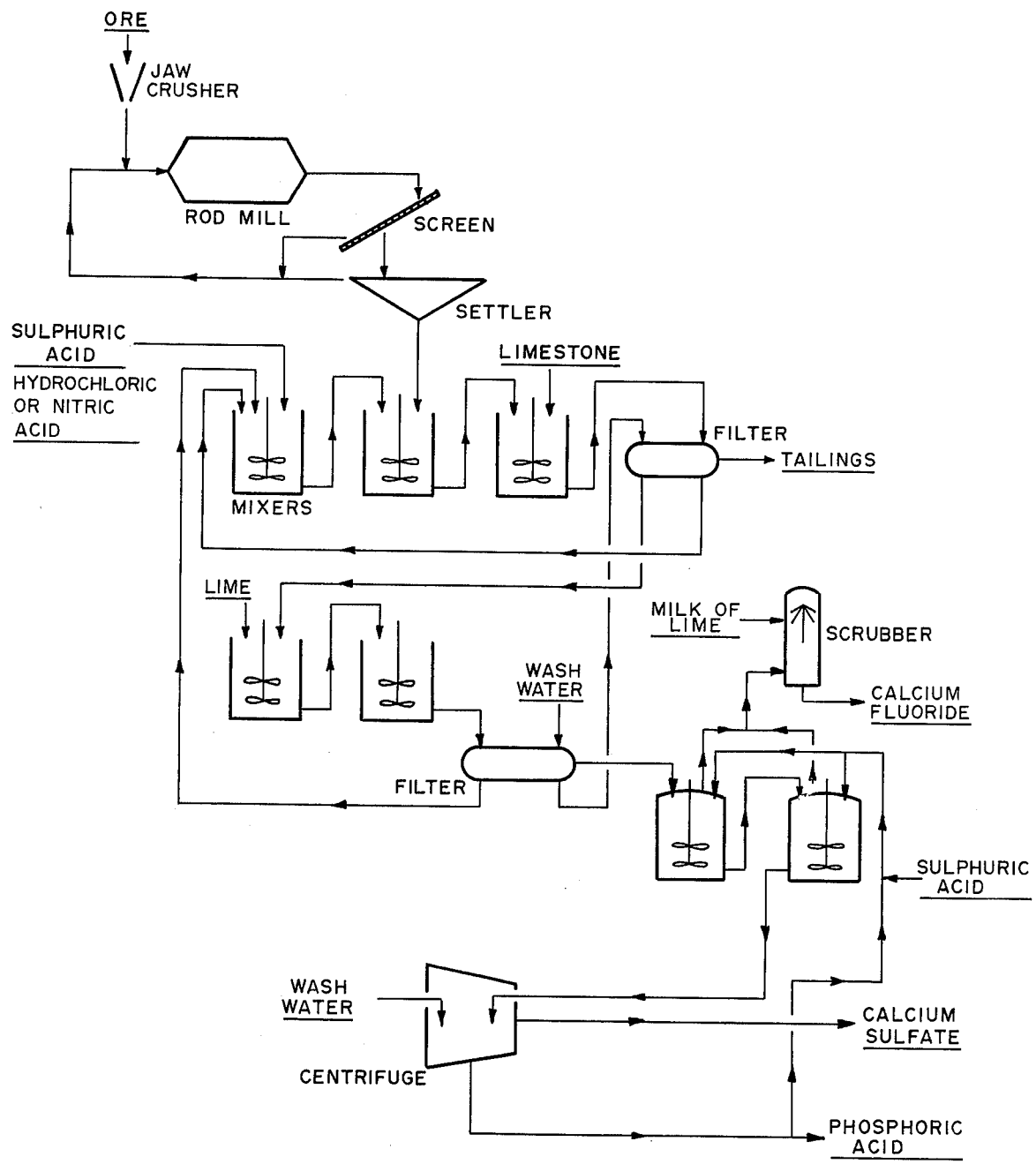
FIG. 2 is a schematic flow diagram of a highly preferred embodiment of the present process including a preferred manner of obtaining the precipitated dicalcium phosphate for use in the process.

For a specific example as to how the process of the present invention may be carried out in more detail, reference is made to the accompanying flow sheet FIG. 2, diagrammatically representing the process in the operation of one embodiment of the process of the present invention. In this embodiment a phosphatic-mineral-containing source material, as-mined ore, was crushed as necessary by a jaw crusher and an impactor such as a rod mill and then sized to about 12 mesh, and preferably through about 16 mesh Tyler screens. The phosphate bearing mineral was pre-wetted and degassed in a pug mill (not shown), using a recycled portion of leach liquor, when the ore was high in carbonates. The wetted ore was passed to one or more mix tanks and contacted with an aqueous leach acid mixture of sulfuric acid and an acid selected from the group of hydrochloric acid and nitric acid, in approximate proportions of about ¾ mole of the second acid, about 1⅛ mole sulfuric acid and about 52⅛ moles of water to maintain an about 6 equivalents of acid and about one mole of calcium per mole of $P_2O_5$ in the phosphatic-mineral-containing material. After thorough mixing to leach the phosphate values from the ore, a phosphoric acid leach liquor containing about 5–7% $P_2O_5$ was obtained. In the last mixing tank, or at the last interval in a singular mixing tank, sufficient limestone or the like was added to the mixture to raise the pH to about 2–2.2, and the leach liquor was withdrawn and separated from the tailings. The leach liquor was partially neutralized at this stage in order to precipitate iron and aluminum impurities along with the tailings for separation from the leach liquor. The leach liquor, separated from the tailings, was then passed to a second set of mixing tanks where the pH was further raised to about 3–5 and preferably about 3.5 to precipitate calcium phosphate, along with any fluorides present. The precipitate was washed and passed to a third set of mixing tanks where the reaction medium of the present invention of dilute sulfuric acid and phosphoric acid was added in two portions. Before combining with the precipitated calcium phosphate, the reaction medium was adjusted to 45° C. It contained 26.4% $P_2O_5$ phosphoric acid moiety and 8.91% sulfuric acid moiety in water. As the reaction of the sulfuric acid with the dicalcium phosphate is exothermic, preferably in the first partial addition only sufficient sulfuric and phosphoric acids portion is added to raise the temperature to about 55° C whereupon hydrogen fluoride will evolve. This addition of sulfuric and phosphoric acids was about 20% by weight of the reaction medium of the invention. The hydrogen fluoride may be passed through a scrubber and treated with additional milk of lime so as to obtain and separate calcium fluoride, and clarified air is passed to the atmosphere. As it is believed that the fluorine present in the leach liquor is present as $H_2F^+$ ion instead of as a complex with silicon and aluminum as found in conventionally strong acid leach systems, it appears that by addition of a small portion of the sulfuric acid with some heat, the $H_2F^+$ ion is evolved off as hydrogen fluoride which may be recovered as calcium fluoride by passing it through a scrubber and treating with lime and the like alkaline materials as shown in FIG. 2.

The remaining 80% portion of the sulfuric acid and phosphoric acid or recycle phosphoric acid were then added with the requisite water dilutions. After the second addition of the remainder of the dilute phosphoric acid-sulfuric acid reaction medium, with thorough mixing and agitation, the resulting phosphoric acid and precipitated gypsum are separated as by passing to a centrifuge as shown in FIG. 2 or passing through other appropriate means such as a filter or series of filters and the like for separating the solution of phosphoric acid from the precipitated gypsum. This results in the production of pure ortho-phosphoric acid of about 40% $P_2O_5$ or above as well as a highly filterable pure gypsum very low in occluded phosphate value. When desirable, a portion of the obtained phosphoric acid solution may be incorporated into a recirculation system as shown in FIG. 2, which may require addition of water to maintain proper dispersion of the reaction mixture.

It has been found by specific examples according to FIG. 2 procedure that, while maintaining the reaction temperature at about 45° C, if the precipitated dicalcium phosphate is metered in at a rate or in increments of about 9–10% by weight of the reaction medium, the obtained gypsum contains about 0.04% $P_2O_5$ after washing. With less than 10% addition of precipitated dicalcium phosphate there is a further drop in the occluded phosphate; and above about 14% by weight additions the occluded phosphate in the gypsum increases to about 0.23% $P_2O_5$. Increasing the temperature to 50° C and to 70° C produced a gypsum of 0.95% $P_2O_5$ and 0.118% $P_2O_5$ respectively with the 10% addition rate of precipitated dicalcium phosphate. Typical Specific results obtained on two different ores following the above described procedure were:

| Material | %$P_2O_5$ | %F | %$Fe_2O_3$ | %$Al_2O_3$ |
|---|---|---|---|---|
| ore #1 | 32.0 | 2.30 | 1.33 | 1.38 |
| liquor after leach precipitated dicalcium phosphate | 6.30 | 0.48 | 0.18 | 0.14 |
| phosphoric acid, after 8 dicalcium phosphate dihydrate increments (10% portions to reaction medium of 26.4% $P_2O_5$ and 8.91% $H_2SO_4$) | 44.80 | 1.69 | 0.70 | 0.09 |
| gypsum | 38.0 0.03 | 1.27 | 0.61 | 0.33 |
| %efficiency from ore to acid product = 90.6 | | | | |
| ore #2 | 20.0 | 1.30 | 2.20 | 0.66 |
| liquor after leach precipated dical | 5.27 | 0.44 | 0.18 | 0.18 |
| phosphoric acid, after 8 dicalcium phosphate dihydrate increments (10% portions to reaction medium of 26.4% $P_2O_5$ and 8.91% $H_2SO_3$) | 39.83 | 1.12 | 0.25 | 0.03 |
| gypsum | 41.32 0.01 | 0.43 | 0.34 | 0.03 |

% efficiency from ore to acid product = 87.3 In another run, the above-described procedure was followed for a third ore, except that the precipitated dicalcium phosphate dihydrate, before being added to the reaction medium, was heated slowly to lose its water of crystallization and form the anhydrite. This material was then metered into the reaction medium in increments of 15% by weight of the reaction medium. The results obtained were:

| Material | %$P_2O_5$ | %F | %$Fe_2O_3$ | %$Al_2O_3$ |
|---|---|---|---|---|
| ore #3 | 14.75 | 1.12 | 2.36 | 1.13 |
| liquor after leach precipitated dicalcium phosphate anhydrite | 5.30 | 0.040 | 0.15 | 0.13 |
| phosphoric acid after 4 dical additions, each 15% of reaction medium | 51.9 | 1.05 | 1.60 | 1.50 |
| gypsum | 41.60 0.28 | 0.50 | 1.40 | 1.30 |

% efficiency from ore to acid product = 84 In the run for ore #3 it was observed that the washing of the gypsum was not operating at full efficiency and this would account for some of the increased phosphate value remaining in the gypsum but principally the higher addition rate of the dicalcium phosphate ingredient and maintaining that higher addition rate through successive additions where the $P_2O_5$ content of the reaction mixture had already reached high levels resulted in more than preferred levels of $P_2O_5$ in the gypsum. Had the amounts of dicalcium phosphate being sequentially added been lowered, especially after the second or third addition, it is expected that the content of $P_2O_5$ in the gypsum would have been in the preferred range of less than 0.25%.

Under ordinary conditions of routine operation in preferred ranges the phosphoric acid product of this process contains about 40% to about 45% $P_2O_5$ and the gypsum obtained has well formed crystals which permit ready filtering and washing. The content of $P_2O_5$ in the gypsum is less than 0.2% and generally on the order of 0.08–0.18% which allows it to be used in many processes without further purification. In addition, because of its readily filterable nature portions of the gypsum may be recycled to prior steps in either the process of obtaining the leach liquor or the process of converting the precipitated calcium phosphate to phosphoric acid for use as a filter aid at any stage of filtration desired.

The obtained phosphoric acid, because of its purity and high $P_2O_5$ content, further may be directly ammoniated if desired, to diammonium phosphate and the like products without evaporation. This has the advantages of eliminating not only ordinarily required processing steps but also by-passes evaporator equipment which tends to suffer extensive scaling with ordinarily produced phosphoric acid.

It will be apparent from the above descriptions of the invention and the drawings that various modifications in the process and apparatus described may be made within the scope of the invention. For example the precipitated calcium phosphate starting material may be obtained in various manners and be of varying composition i.e. depending on whether fluorides are removed prior to or after precipitating dical. Optionally, if the phosphate ore being treated is high in calcium carbonate, a portion of the ore might be roasted to calcine the carbonate to calcium oxide for use in the process or some additional sulfuric acid might be included in the acid leaching mixture to convert that carbonate to gypsum instead of pre-wetting with a portion of the leach liquor as described hereinabove. Therefore the invention is not intended to be limited to the specific details described herein except as may be required by the following claims.

What is claimed is:

1. A process for the production of ortho phosphoric acid from phosphate-mineral-containing material through an intermediate precipitated dicalcium phosphate, comprising the steps of:
   (1) Contacting phosphate-mineral-containing material with an aqueous leach acid mixture of sulfuric acid and a second acid selected from the group essentially consisting of hydrochloric acid and nitric acid, in approximate proportions of about ¾ mole of the second acid, about 1⅛ mole sulfuric acid and 52 moles water;
   (2) separating a phosphoric acid leach liquor containing about 5–7% $P_2O_5$ from a remaining spent material;
   (3) increasing the pH of the leach liquor to about 3–5 with a basic calcium compound to precipitate dicalcium phosphate, and separating the precipitated dicalcium phosphate;
   (4) forming a fluid reaction medium of about 20% $P_2O_5$, about 4–12% sulfuric acid and about 60–40% water, at a temperature of about 25° C. to about 80° C.;
   (5) adding a portion of the dicalcium phosphate comprising about 6–16% by weight of the fluid reaction medium so as to convert the dicalcium phosphate to phosphoric acid solution and to precipitate gypsum;
   (6) withdrawing a portion of the fluid reaction medium containing phosphoric acid and gypsum, filtering to separate the gypsum, and returning the obtained phosphoric acid to the fluid reaction medium;
   (7) repeating steps (5) and (6) and each time adding an amount of sulfuric acid comprising about 4–12% by weight of the fluid reaction medium until an about 30–45% $P_2O_5$ phosphoric acid is obtained; and
   (8) separating an about 30–45% $P_2O_5$ phosphoric acid product.

2. The process of claim 1 in which the sulfuric acid is added in an amount comprising about 4–9% by weight of the fluid reaction medium.

3. The process of claim 1 including the additional step of solubilizing at least a portion of the precipitated dicalcium phosphate in an about 20 to about 35% $P_2O_5$ phosphoric acid solution before adding the dicalcium phosphate to the fluid reaction medium.

4. The process of claim 1 including the additional steps of forming a pre-mix to the fluid reaction medium comprising water, about 4–8% by weight sulfuric acid and about 20–35% by weight phosphoric acid; adding precipitated dicalcium phosphate and said pre-mix into fluid the reaction medium; and withdrawing an about 40% $P_2O_5$ phosphoric acid product and precipitated gypsum.

5. The process of claim 4 in which dicalcium phosphate is added in an amount of about 9% by weight of the reaction medium.

6. The process of claim 1 including the additional steps of washing the separated gypsum with water; combining portions of said wash water with a portion of the about 30–45% $P_2O_5$ phosphoric acid product to obtain an about 20–35% $P_2O_5$ solution; and adding the 20–35% solution into the fluid reaction medium.

7. The process of claim 6 including the further step of adding at least a portion of the gypsum to the leach liquor; and filtering to separate the leach liquor from spent material.

8. The process of claim 1 including the further steps of washing the obtained gypsum with water; adding at least a portion of the washed gypsum to the leach liquor and filtering it to separate spent material; and adding at least a portion of the obtained wash water to the the fluid reaction medium.

9. The process of claim 1 in which the pH of the leach liquor is increased to about 2–3 to precipitate impurities except magnesium and then increased in step (3) to about 3–5 to precipitate dicalcium phosphate.

10. The process of claim 1 in which the pH is increased in step (3) in a single step to about 3–5; and then fluorine impurities are removed from the reaction mixture by heating to evolve hydrogen fluoride gas.

11. The process of claim 10 in which fluorine is converted to calcium fluoride.

12. The process of claim 1 in which the pH of the leach liquor is increased first to about 2–3 to precipitate impurities except magnesium and the impurities precipitated thereby are separated from the solution remaining; then the pH of the solution remaining is increased in step (3) to about 3–4 to precipitate dicalcium phosphate, and the phosphate precipitated thereby is separated from the remaining solution; and then the pH is increased to about 7–9 on the remaining solution to precipitate magnesium, and the magnesium precipitated thereby is separated.

13. The process of claim 1 including the further additional step of adding ammonia to the separated phosphoric acid to directly obtain ammonium phosphates.

14. The process of claim 1 including the additional step of adding at least a portion of the separated gypsum to the phosphate-mineral-containing material before leaching and passing the leach liquor through a filter to separate spent material from the leach liquor.

* * * * *